Sept. 15, 1959 M. L. STINSON 2,904,166
ADJUSTABLY SUPPORTED RETURN IDLER
ASSEMBLY FOR BELT CONVEYORS
Filed Nov. 5, 1958 2 Sheets-Sheet 1
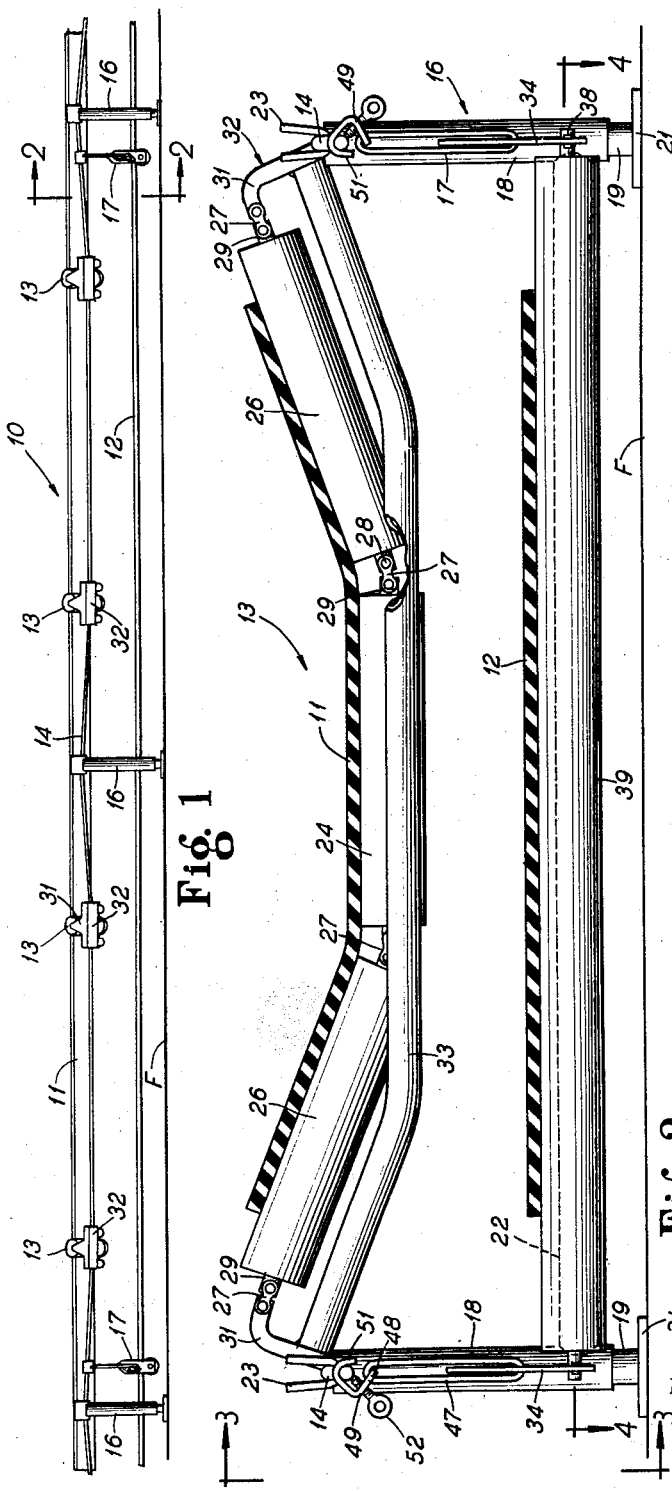
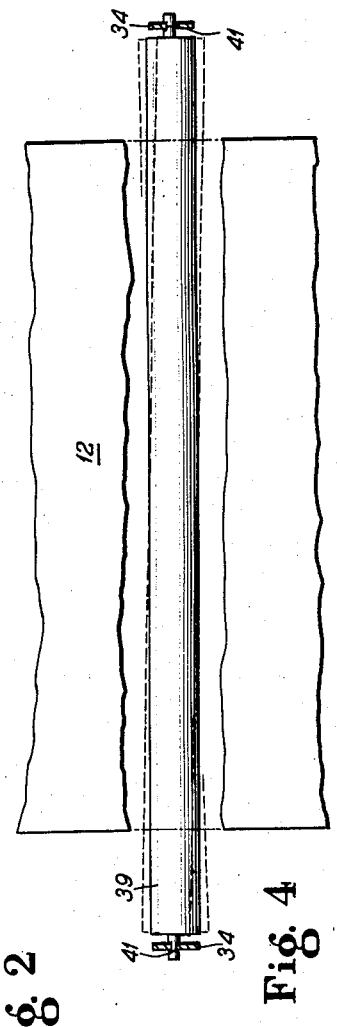
INVENTOR.
Mary L. Stinson
BY
Murray A. Gleeson
ATTORNEY United States Patent Office 2,904,166
Patented Sept. 15, 1959

2,904,166
ADJUSTABLY SUPPORTED RETURN IDLER ASSEMBLY FOR BELT CONVEYORS

Mary L. Stinson, Chicago, Ill., assignor to Goodman Manufacturing Company, Chicago, Ill., a corporation of Illinois Application November 5, 1958, Serial No. 772,013

3 Claims. (Cl. 198—202)

This invention relates to improvements in supports for the return idlers of an endless belt conveyor.

Apparatus according to the present invention has particular application with conveyors in underground mines, where it is desirable to vary easily and quickly the position of the idlers supporting the return reach of the belt. Where the conveyor is operating over a heaving mine floor this is especially important since the floor may come into contact with both the return idler rollers and the return reach to displace same and cause misalignment.

The return idler assembly according to the present invention is not only capable of adjustment vertically in its position but it is also capable of exerting a retraining effect to a misaligned belt. The return idler is accordingly pendently supported, and is capable of swiveling movement in a generally horizontal plane to exert a force on the belt corrective of misalignment.

It is a principal object of this invention to provide an improved adjustably supported return idler assembly for the return reach of an endless belt conveyor, such idler assembly being capable of being readily adjusted to a desired position.

Another object is to provide an improved adjustably supported return idler assembly capable of providing retraining of a misaligned belt.

Other objects and important features of the invention will be apparent from a study of the specification following taken with the drawings which together describe and illustrate a preferred embodiment of the invention, and what is now considered to be the best mode of practicing the principles thereof. Other embodiments may be suggested to those having the benefit of the teachings herein, and such other embodiments are intended to be reserved especially as they fall within the scope and purview of the subjoined claims.

In the drawings:

Figure 1 is a side elevational view of an endless belt conveyor having the improvements according to the present invention embodied therein;

Figure 2 is an elevational view looking in the direction of the arrows 2—2 of Figure 1;

Figure 3:
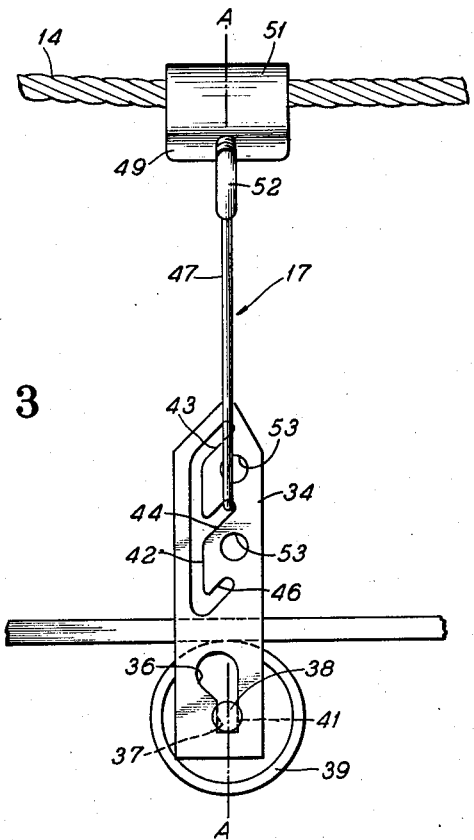

Figure 3 is an elevational view of the improved adjustably supported return idler assembly seen in Figures 1 and 2, said view looking in the direction of the arrows 3—3 of Figure 2; and Figure 4 is a plan view of an idler roller of the idler assembly seen in Figure 3, said view looking in the direction of the arrows 4—4 of Figure 2.

Referring now to Figure 1 of the drawings, the improvements according to the present invention are embodied in an endless belt conveyor 10 having a conveying reach 11 and a return reach 12. The conveying reach 11 is guided upon idler assemblies indicated generally by the reference numeral 13 and supported upon laterally spaced flexible support strands 14. Supports for the flexible strands 14 are indicated generally by the reference numeral 16, and support the strands 14 at intervals throughout their length, the support stands 16 resting upon a mine floor F or the like.

The return reach 12 is also supported from the laterally spaced strands 14 by an adjustably supported return idler assembly indicated generally by the reference numeral 17. Alternately, such assemblies 17 may be supported from a mine roof or other support point, not shown.

Referring now to Figure 2, the stands 16 comprise two laterally spaced column members 18 in telescoping engagement with members 19 provided with feet 21 in engagement with the mine floor F. The two column members 18 are maintained in properly spaced apart relationship by means of a laterally extending strut member 22. Means, not shown, may be provided for adjusting the position of members 18 and 19 in accordance with irregularities in the mine floor F.

Each of the column members 18 is provided with a U-shaped saddle 23 at the top thereof for guiding a support strand 14.

The idler assembly 13 for the conveying reach 11 consists of a central load supporting roller 24 flanked by inclined wing rollers 26. These rollers are articulately connected together for movement in a vertical plane by connecting links 27 having pin connections at 28 to shafts 29 upon which each of the rollers turns. The outer ends of the shafts supporting the rollers 26 are similarly connected by links 27 to an arm 31 forming part of a bracket assembly 32 for holding the idler assembly 13 to the rope strands 14. Strut members 33 flank the rollers 24 and 26 and are joined at their ends to the brackets 32.

Referring now also to Figures 3 and 4, the adjustably supported return idler assembly 17 consists of a pair of adjustment plates 34, each of which is provided at the lower end thereof with an opening 36 having a slot 37 extending downward therefrom. The slot 37 provides a support for a shaft 38 of a return idler roller 39, the shaft 38 having milled flats 41 thereon, the distance between the milled flats 41 corresponding to the width of the slot 37.

The adjustable plate 34 has a slot 42 extending lengthwise thereof, generally close to one edge of the plate 34, and the slot 42 is continuous with slot portions 43, 44 and 46 extending at an angle thereto and in an upward direction when the plate 34 is suspended in the manner shown. The ends of the slot portions 43, 44 and 46 lie along a line of centers A—A which is common also to the center of the shaft 38.

The position of the adjustable plate 34 can be adjusted by means of a closed link 47, the upper end of which passes through an aperture 48 in a lower limb 49 of a hook type hanger 51 shown in position on the rope strand 14. The hook type hanger 51 can be securely held in position on the strand 14 by means of a screw eye 52 threadably engaged with the limb 49.

It will be observed that the plate 34, link 47 and hanger 51 are at all times in assembled relationship ready to be suspended from the support strand 14.

The adjustable plate 34 has punched out portions 53 which maintain the center of gravity of the plate 34 below the slot portion 46, so that the adjustment plate will always hang substantially vertically even though the roller 39 is not yet placed in position at the slot 37. This is important in the setup of the conveyor, the hanger 51, the link 47 and the adjustment plate 34 being ordinarily placed in position before the roller 39 is positioned.

It may be noted that the adjustably supported return idler assembly 17 is shown in the several figures as being suspended from the rope strands 14. Alternately, however, the support point for the assembly 17 need not be the rope strand, and instead the assembly may be supported by a roof bolt, not shown, secured from an overhead support point such as a mine roof or the like.

Referring now to Figure 4, the return idler roller assembly 17 is capable of swinging in a generally horizontal plane about its upper support points with the return idler roller 39 also swiveling in a generally horizontal plane. The amount of such swiveling movement is shown in dotted outline in Figure 4, and such swiveling movement gives a retraining effect to the return reach 12. It has been found that if the return reach 12 swings to the right end of the idler roller 39 as seen in Figure 4, that such right end will swing in a "downstream" direction to apply a corrective retraining effect.

The structure according to the present invention is especially useful where the conveyor 10 is placed on a heaving mine bottom. The assembly 17 can be adjusted up or down in accordance with the heaving of the bottom so that both the roller 39 and the return reach 12 do not contact the mine bottom.

While the invention has been described in terms of a preferred embodiment thereof its scope is intended to be limited only by the claims here appended.

I claim as my invention:

1. An adjustably supported idler assembly comprising a support member, a link pendently supported thereby, an adjustable plate pendently supported by said link and having first slot means at the lower end thereof engaging an end of said idler, second slot means in said adjustable plate enabling the position of said idler to be varied with respect to said support member, said second slot means including an elongated portion extending lengthwise of said plate and spaced transverse portions extending at an angle from said elongated portion, said link being selectively engageable with any one of said transverse portions thereby enabling said adjustable plate to hang pendently from said link in a plurality of adjusted positions at different distances from said support member.

2. An adjustably supported idler assembly comprising a support member, a link pendently supported thereby, an adjustable plate pendently supported by said link and having means at the lower end thereof for supporting an end of said idler, and slot means in said adjustable plate enabling the position of said idler to be varied with respect to said support member, said slot means including an elongated slot and connecting slot portions disposed at different distances from said support member and extending transversely to the length of said slot, said link being selectively engageable with any one of said slot portions thereby enabling said adjustable plate to hang pendently from said link in a plurality of adjusted positions at different distances from said support member.

3. An adjustably supported idler assembly comprising a support member, a link pendently supported thereby, an adjustable plate pendently supported from said link and having means for supporting an end of said idler, and means in said adjustable plate enabling the position of said idler to be varied with respect to said support member comprising an elongated slot having slot portions spaced apart and extending transversely from said slot, said link being selectively engageable with any one of said slot portions enabling said adjustable plate to hang pendently from said link in a plurality of adjusted positions.

References Cited in the file of this patent

FOREIGN PATENTS

| | | |
|---|---|---|
| 461,751 | Germany | June 27, 1928 |
| 585,327 | Germany | Oct. 2, 1933 |